US012595698B2

(12) United States Patent
Schroder

(10) Patent No.: US 12,595,698 B2
(45) Date of Patent: Apr. 7, 2026

(54) SASH CARRIER FOR A WINDOW

(71) Applicant: Pella Corporation, Pella, IA (US)

(72) Inventor: Paul D. Schroder, Pella, IA (US)

(73) Assignee: Pella Corporation, Pella, IA (US)

( * ) Notice: Subject to any disclaimer, the term of this patent is extended or adjusted under 35 U.S.C. 154(b) by 308 days.

(21) Appl. No.: 18/122,766

(22) Filed: Mar. 17, 2023

(65) Prior Publication Data

US 2023/0295969 A1 Sep. 21, 2023

Related U.S. Application Data

(60) Provisional application No. 63/269,580, filed on Mar. 18, 2022.

(51) Int. Cl.
*E05D 15/16* (2006.01)
*E05C 17/60* (2006.01)

(52) U.S. Cl.
CPC ........... *E05D 15/165* (2013.01); *E05D 13/04* (2013.01)

(58) Field of Classification Search
CPC ..... E06B 3/5063; E05D 15/165; E05D 13/00; E05D 13/12; E05D 15/22
USPC .................................. 49/445, 161, 176, 181
See application file for complete search history.

(56) References Cited

U.S. PATENT DOCUMENTS 1,997,822 A 4/1935 Hamm
2,835,934 A 5/1958 Abraham
4,257,202 A 3/1981 Biro
4,718,194 A * 1/1988 FitzGibbon ......... E05D 13/1207 49/181
4,961,247 A 10/1990 Leitzel et al.
5,014,466 A * 5/1991 Winner ................. E06B 1/6069 52/786.13
5,210,976 A * 5/1993 Cripps ................ E05D 13/1276 49/181
5,353,548 A 10/1994 Westfall
5,463,793 A 11/1995 Westfall
6,584,644 B2 * 7/2003 Braid .................. E05D 13/1276 16/197
10,180,015 B1 * 1/2019 Grainger ................. E05D 15/22
10,415,287 B1 * 9/2019 Kunz .................... E06B 3/5063
2004/0006845 A1 * 1/2004 Polowinczak ...... E05D 13/1276 16/197
2004/0163209 A1 * 8/2004 Pettit ................... E05D 13/1276 16/197
2006/0150514 A1 * 7/2006 Miller ..................... E05C 9/002 49/394

(Continued)

FOREIGN PATENT DOCUMENTS

CA 2119506 A1 2/1997
GB 9406149 5/1994
GB 2276655 B 6/1996

*Primary Examiner* — Daniel P Cahn
*Assistant Examiner* — Matthew R. Shepherd

(57) ABSTRACT

Sash carriers mounted to the sides of a sash support the sash in a window frame for sliding movement between sliding closed and sliding open positions. Balance springs on the sash carriers counterbalance the weight of the sash during the sliding movement. The sash can be mounted to the sash carriers for tilting movement between tilt closed and tilt open positions. Brakes on the sash carriers are actuated by the sash when the sash is moved to the tilt open position, and inhibit sliding movement of the sash carriers and sash when the sash is in the tilt open position.

18 Claims, 8 Drawing Sheets

(56) References Cited

U.S. PATENT DOCUMENTS

| | | | | |
|---|---|---|---|---|
| 2007/0157521 | A1* | 7/2007 | Ito | E06B 3/5063 49/185 |
| 2010/0229468 | A1* | 9/2010 | Allen | E06B 9/90 160/98 |
| 2012/0279131 | A1* | 11/2012 | Haba | E05D 13/006 188/166 |
| 2013/0283699 | A1* | 10/2013 | Kellum, III | E05D 13/08 49/429 |
| 2014/0041326 | A1* | 2/2014 | Kadavy | E06B 7/22 49/476.1 |
| 2014/0259936 | A1* | 9/2014 | DeNormand | E05D 15/22 49/161 |
| 2016/0298369 | A1* | 10/2016 | Kunz | E05D 13/04 |
| 2018/0291660 | A1* | 10/2018 | Kellum | E05D 15/22 |
| 2021/0123291 | A1 | 4/2021 | Schroder | |

* cited by examiner

SASH CARRIER FOR A WINDOW

TECHNICAL FIELD

Various aspects of this disclosure relate to fenestration products, such as windows. In some specific examples, the disclosure relates to structures for mounting windows, to a frame.

BACKGROUND

Fenestration units such as hung windows include sashes mounted to a frame. Double-hung windows include two sashes mounted in the frame, each of which is operable for sliding movement (e.g., up and down) between open and closed positions independently of one another. The two sashes are stacked, and typically meet and overlap by a small amount in the middle of the window. Single-hung windows have one fixed or non-operable sash, and one operable or movable sash. The sliding sashes in hung windows may be supported by spring balance systems to counterbalance the weight of the sash. The operable sashes may also be configured to tilt or pivot with respect to the frame, typically inwardly, about a rotational axis at a bottom portion of the sash (e.g., for cleaning).

There remains a need for improved fenestration units. In particular, there is a need for improved structures for attaching sashes to the frames. Such structures that enhance the functionality of the window would be particularly advantageous.

SUMMARY

Various aspects of the disclosure relate to a sash carrier, or other barrier or panel carrier, that can be used to slidably mount the barrier or panel to a fenestration unit such as a window. An exemplary sash carrier comprises a body configured for sliding movement on a frame member of the fenestration unit, a sash mount, and one or more balance springs. The body may include a first side to face the frame, and a second side opposite the first side. The sash mount is configured to mount the sash to the second side of the body. The balance springs are on the first side of the body.

In some examples, the sash mount includes a pivot mount to enable the sash to rotate between a tilt closed position and a tilt open position with respect to the body.

Some examples include a brake on the first side of the body. The brake is operable between a release position enabling sliding movement of the sash carrier on the frame member, and a brake position inhibiting sliding movement of the sash carrier on the frame member. In some examples the brake may be operable by the sash mounted to the sash mount. For example, the brake may be configured to be in the release position when the sash is in the tilt closed position, and in the brake position when the sash is in the tilt open position. Embodiments of the brake may include an engagement portion, a biasing member and an actuator portion. The engagement portion may be movable between a retracted position with respect to the body when the brake is in the release position and an extended position with respect to the body when the brake is in the brake position. The biasing member may bias the engagement portion to the retracted position when the sash is in the tilt closed position. The actuator portion may be configured to be actuated by the sash and to move the engagement portion to the extended position when sash is in the tilt open position.

In some examples the body is an elongated extrusion including a component mounting slot on the first side. The component mounting slot may, for example, include a T-shaped opening. The sash carrier may include one or more brake mounting members such as a pin extending from a base, where the base is slid into the mounting slot and secured to the body at a desired position. The sash carrier may include one or more balance spring mounting members such as a pin extending from a base, where the base is slid into the mounting slot and secured to the body at a desired position. The sash carrier may include an end cap. The end cap may include one or more mounting members configured to be secured to the mounting slot.

In some examples the body comprises an elongated extrusion. The extrusion may include a base wall defining the first and second sides of the body, a first side wall extending from the base wall toward the first side and a second side wall extending from the base wall toward the first side. Examples of the extrusion may also include a first lip extending from the first side wall, and a second lip extending from the second side wall The first and second side walls and first and second lips may be configured to engage the frame member and to enable the body to slide in the frame member. The extrusion includes a component mounting slot in some examples.

Examples also include fenestration units such as a window. The window may comprise a frame including first and second opposite side frame members, and at least two sash carriers such as those described above. Each of the sash carriers is mounted for sliding movement to one of the first and second side frame members. A panel such as a window is mounted to the at least two sash carriers.

Examples include a fenestration unit that comprises a frame including a first jamb and a second jamb, a sash including a first side and second side, and first and second sash carriers. Each sash carrier couples one of the first side or the second side of the sash to one of the first jamb or the second jamb of the frame. The first and second sash carriers may include (1) a body comprising a first side coupled for sliding movement on one of the first jamb or the second jamb, wherein the sash carriers facilitate the sliding movement of the sash between a sliding closed position and a sliding open position on the frame, and a second side opposite the first side, (2) a sash mount coupling one of the first side or the second side of the sash to the second side of the body, wherein the sash carriers facilitate rotating movement of the sash between a tilt closed position and a tilt open position with respect to the frame, (3) one or more balance springs coupled to the body, and (4) a brake coupled to the body and operable by the sash between a release position facilitating the sliding movement when the sash is in the tilt closed position and a brake position inhibiting the sliding movement when the sash is in the tilt open position.

Examples include a sash carrier for a fenestration unit. The sash carrier may comprise an elongated body, for example an extrusion, including (1) a first side configured for sliding movement between a sash closed position and a sash open position on a fenestration unit frame and a second side opposite the first side, (2) a sash mount to mount a sash to the second side of the body, and (3) one or more seal members on the body to provide a weather-resistant seal between the body and the fenestration unit frame.

While multiple inventive examples are specifically disclosed, various modifications and combinations of features from those examples will become apparent to those skilled in the art from the following detailed description. Accordingly, the disclosed examples are meant to be regarded as illustrative in nature and not restrictive. For example, although described below as a sash carrier for carrying a window, the sash carrier can be configured to carry other barriers or panels such as screens and sliding door panels (e.g., with the sash carriers configured and mounted to provide horizonal sliding motion of the door panels).

Figure 1:
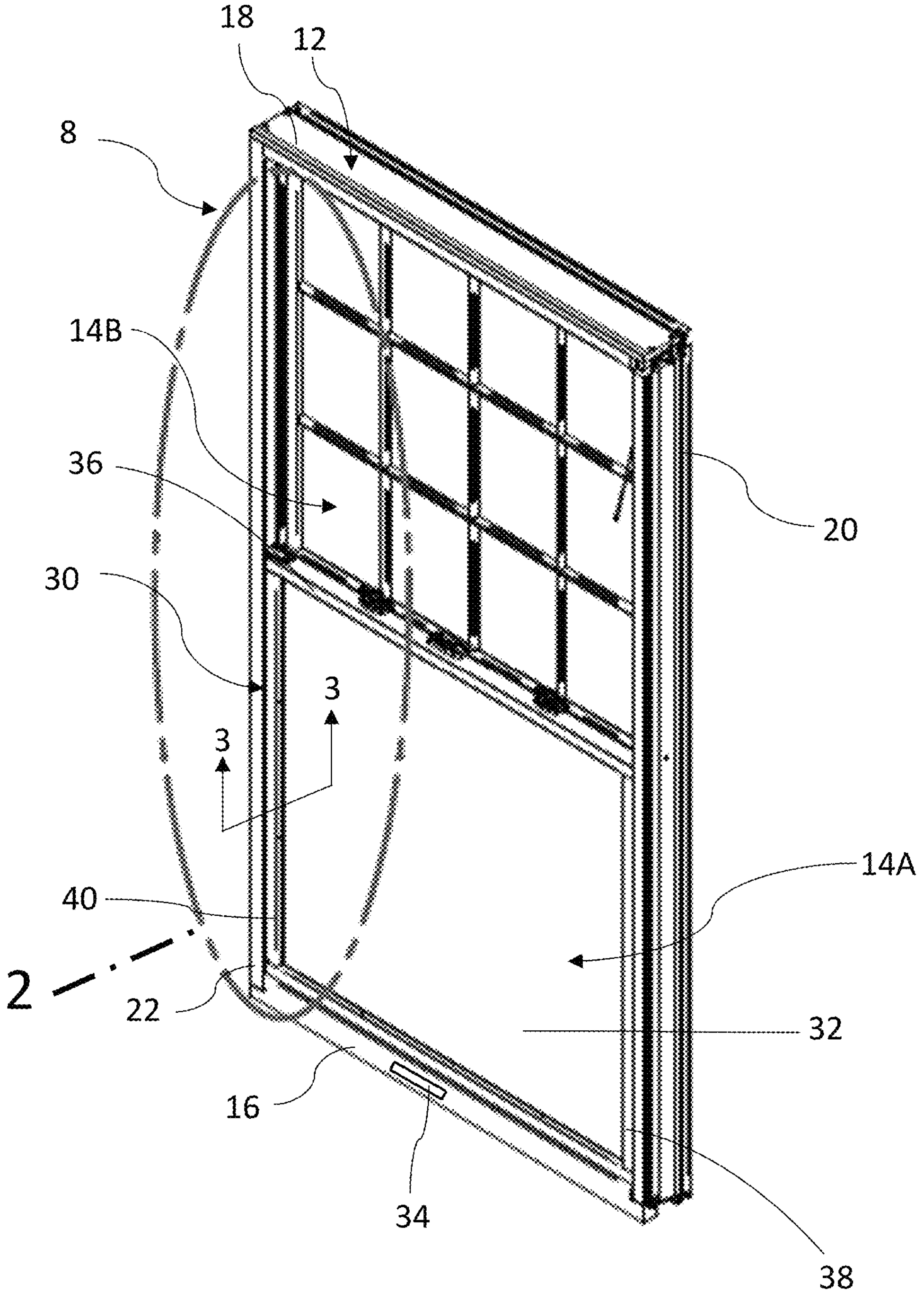
FIG. 1 is an illustration of an exemplary fenestration unit in the form of a window that may include barrier or panel carriers such as sash carriers, in accordance with embodiments.

While the disclosure is amenable to various modifications and alternative forms, specific embodiments have been shown by way of example in the drawings and are described in detail below. The disclosure, however, is not limited to the particular embodiments described. On the contrary, the disclosure is intended to cover all modifications, equivalents, and alternatives falling within the scope of the disclosure as defined by the appended claims.

DETAILED DESCRIPTION

Sash carriers according to the inventive examples may be adapted for fenestration units including a variety of window and door styles (collectively referred to as "fenestration units") including one or more sashes, such as for example window panels, that slide between open and closed positions. Examples include hung windows, such as single-hung and double-hung windows. The sash carriers offer important functionality and advantages. In particular, they provide effective and weather-resistant seals, and smooth sliding motion for window opening and closing. The sash carriers may be efficiently manufactured and assembled.

For example, they provide a sliding bearing for sashes in window frames. Sealing materials such as felt strips at the interface between the sash carrier and a window frame jamb provide smooth and low-friction sliding action. The felt or other material bearings may also function as seals with a long leak path. Primary and at least substantial portions of the seal system are thereby pressure energized. The sashes are guided in grooves in the jambs, and dimensions can be controlled. Installation variations may have insubstantial effect on the operation of the sashes. For example, the seal surfaces are generally parallel to the wall in which sash carriers are used, so hourglass or reverse hourglass installation may not substantially affect engagement of the sealing surfaces.

The sash carrier provides functionality to mount as many constant force balance structures such as springs as needed for a given application. The balance mounts provide for operation of the balances with low friction, and enable low hysteresis from the balances. Space for additional balances enables balance selection for a wide range of cycle endurances.

Embodiments include a brake that may be self-energized to prevent upward motion, while allowing downward motion when the sash is tilted. The brakes are disengaged by the sash when the sash closed.

The top of the sash carrier includes features for locking the sash in place, and for unlocking the sash to permit tilting (e.g., for washing and sash removal). A seal may be positioned on the top end of the sash carrier to block vertical air flow past the back side of the sash carrier.

An exemplary fenestration unit in the form of a double-hung window 8 including sash carriers 10A and 10B in accordance with some examples may be described with reference to FIGS. 1 and 2. As shown, window 8 includes a frame 12 and two sashes 14A and 14B in the form of window panels. Other than the sash carriers 10A and 10B and certain portions of the sashes 14A and 14B that cooperate with the sash carriers (e.g., the brake actuator arm on the pivot mount described below), window 8 may take most any known or otherwise conventional structural configuration. The illustrated embodiments of the frame 12 include a sill 16, a head 18, a first jamb 20 and a second jamb 22. The sill 16 is a structural frame component or member that generally defines a bottom portion of the frame 12, while the head 20 is a structural component or member that generally defines a top portion of the frame. The sill 16 and head 18 each generally extend laterally between the first and second jambs 20 and 22, as shown. The first and second jambs 20 and 22 are structural components or members that extend vertically between the sill 16 and head 18. In various examples, the head 18 is supported by each of the first and second jambs 20 and 22. The first jamb 20 generally defines a first side portion of the frame 12, while the second jamb 22 is situated opposite the first jamb and generally defines a second side portion of the frame.

Figure 2:
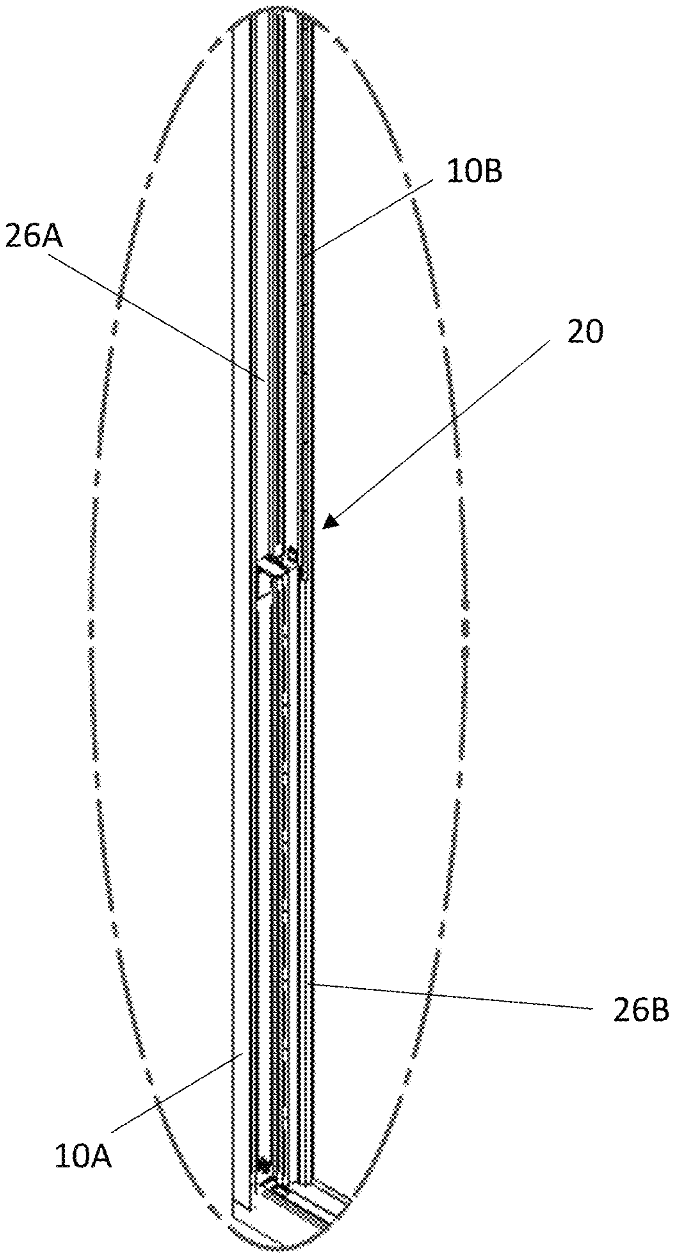
FIG. 2 is a sectional side view of a portion of a window frame shown in FIG. 1, including sash carriers in accordance with embodiments.

FIG. 2 illustrates an interior or sash-facing side of the first jamb 20, with the sash carriers 10A and 10B mounted thereto. The interior, sash-facing side of the second jamb 22 (which is partially visible in FIG. 1) may be a complementary, mirror-image structure of the first jamb 20, and include sash carriers (not shown) that are substantially the same as or similar to the sash carriers 10A and 10B, but complimentary, mirror-image structures of the sash carriers 10A and 10B. As shown, the first jamb 20 includes tracks 26A and 26B that extend between the sill 16 and head 18 to guide the sash carriers 10A and 10B (and the sashes 14A, 14B mounted thereto) for movement along paths between sliding open and sliding closed positions. The tracks 26A and 26B are linear, and parallel to one another in the illustrated embodiments.

Sashes 14A and 14B each include a frame 30 supporting a barrier or panel member such as a glass pane 32. As shown, each frame 30 includes a bottom member 34, a top member 36, a first side member 38, and a second side member 40. The bottom member 34 is a structural frame component that generally defines a bottom portion of the frame 30, while the top member 36 is a structural component that generally defines a top portion of the frame. The bottom member 34 and top member 36 each generally extend laterally between the first and second side members 38 and 40, as shown. The first and second side members 38 and 40 are structural components that extend vertically between the bottom member 34 and top member 36. In various examples, the top member 36 is supported by each of the first and second side members 38 and 40. The first side member 38 generally defines a first side portion of the frame 30, while the second side member 40 is situated opposite the first side member and generally defines a second side portion of the frame 30.

As described in greater detail below, the first side member 38 of sash 14A is mounted to the sash carrier 10A. The second side member 40 of sash 14A is similarly mounted to a sash carrier (not visible in FIGS. 1 and 2) in a track on the second jamb 22 of the window frame 12. The first side member 38 of sash 14B is mounted to the sash carrier 10B. The second side member 40 of sash 14B is similarly mounted to a sash carrier (not visible in FIGS. 1 and 2) in a track on the second jamb 22 of the window frame 12. The sash carriers including carriers 10A and 10B are mounted in the associated tracks such as 26A and 26B for sliding movement along the tracks. By the movement provided by sash carriers such as 10A and 10B, the sashes 14A and 14B can be moved between the sliding open and sliding closed positions in the window frame 12. For example, the first sash 14A may be moved (e.g., in an upwardly direction) between the closed position shown in FIG. 1 at the bottom of the widow 8, to an open position adjacent the closed second sash 14B. Similarly, the second sash 14B may be moved (e.g., in a downwardly direction) between the closed position shown in FIG. 1 at the top of the window 8, to an open position adjacent the closed sash 14A.

Figure 3:
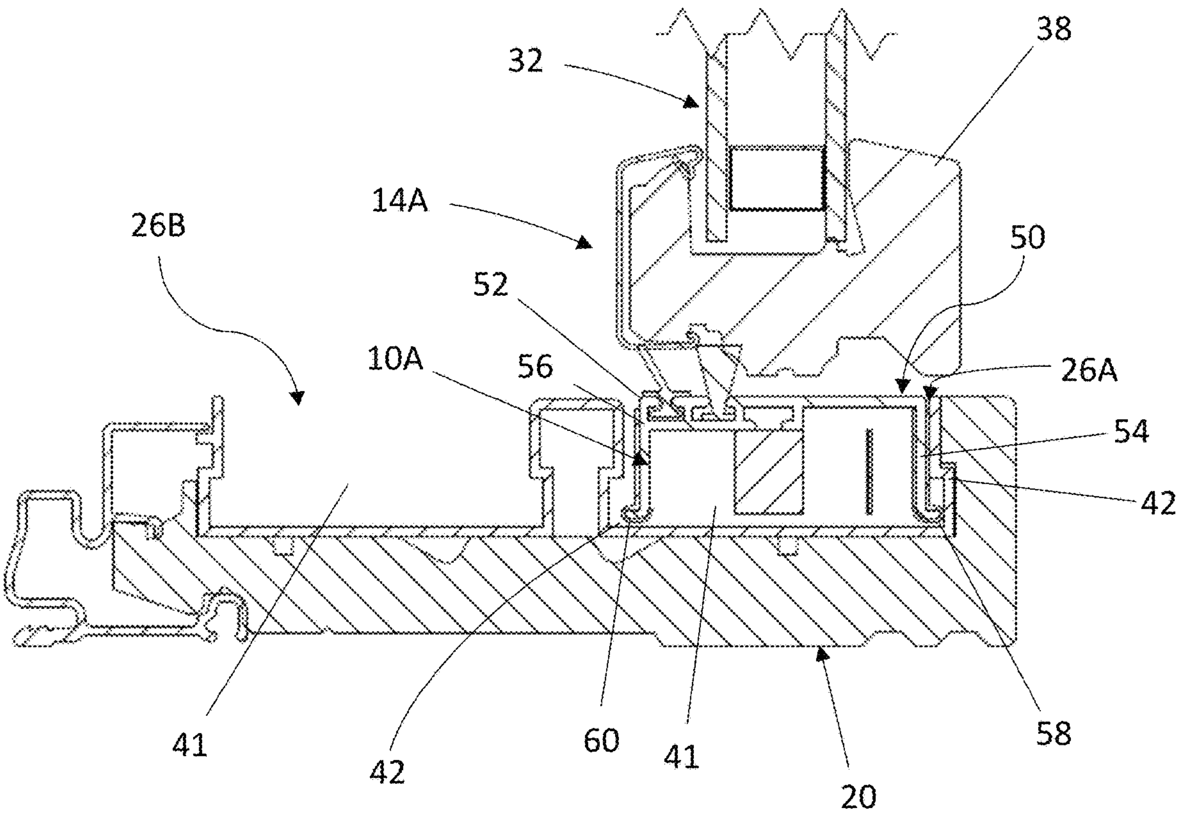
FIG. 3 is a detailed sectional view of a portion of the window frame, sash carrier and a sash taken along line 3-3 in FIG. 1, in accordance with embodiments.

FIG. 3 is a detailed cross sectional illustration showing portions of the first jamb 20, first sash 14A and sash carrier 10A in accordance with some embodiments. The illustrated embodiments of the tracks 26A and 26B include generally T-shaped channels 41 including undercut grooves 42 defined by structures of the first jamb 20. As shown in FIG. 3 and described in greater detail below, the sash carrier 10A includes a body 50 defined by a base portion or wall 52, side portions or walls 54 and 56 extending from the base wall, and lips 58 and 60 extending from the side walls. The channel 41 of the track 26A and the body 50 are sized, shaped and/or otherwise configured to enable the body to be slidably engaged in the channel, allowing the sliding movement of the sash carrier 10A (and sash 14A attached thereto) in the track. In the illustrated embodiments, for example, the cross sectional shape of the body 50 is complimentary to the T-shape of the channel 41, and the lips 58 and 60 of the body extend into the grooves 42 of the channel to provide the slidable engagement functionality of the sash carrier 10A. The other sash carriers such as 10B and other tracks such as 26B of the window 8 may have structures such as those described above to enable the sliding movement of the sash carriers in the tracks. In other embodiments, the sash carrier body and tracks have different structures to provide the slidable movement and engagement functionality of the exemplary jamb 20 and sash carrier 10A described herein.

Figure 4A:
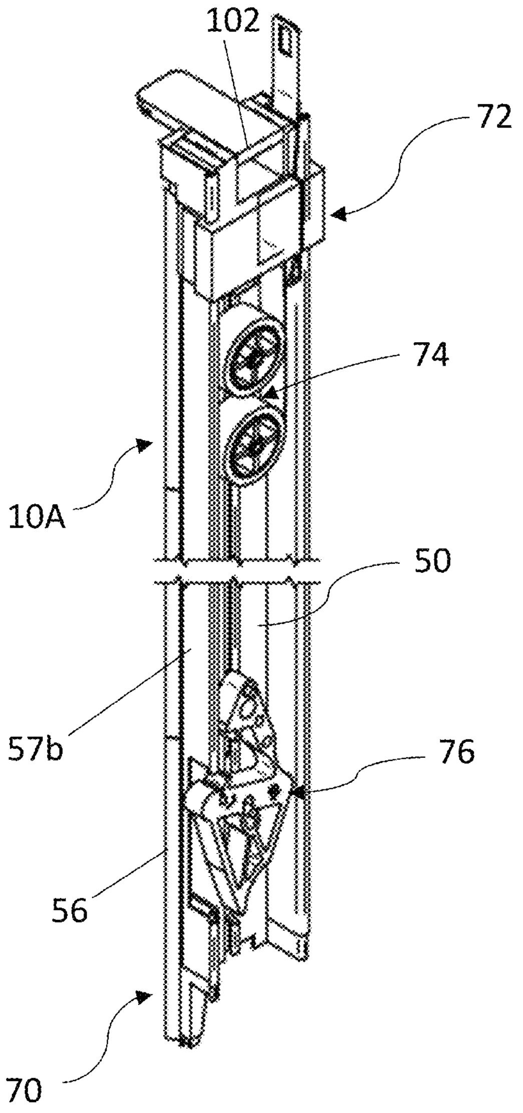
FIG. 4A is an isometric side view of a frame-facing side of the sash carrier, in accordance with embodiments.
Figure 4B:
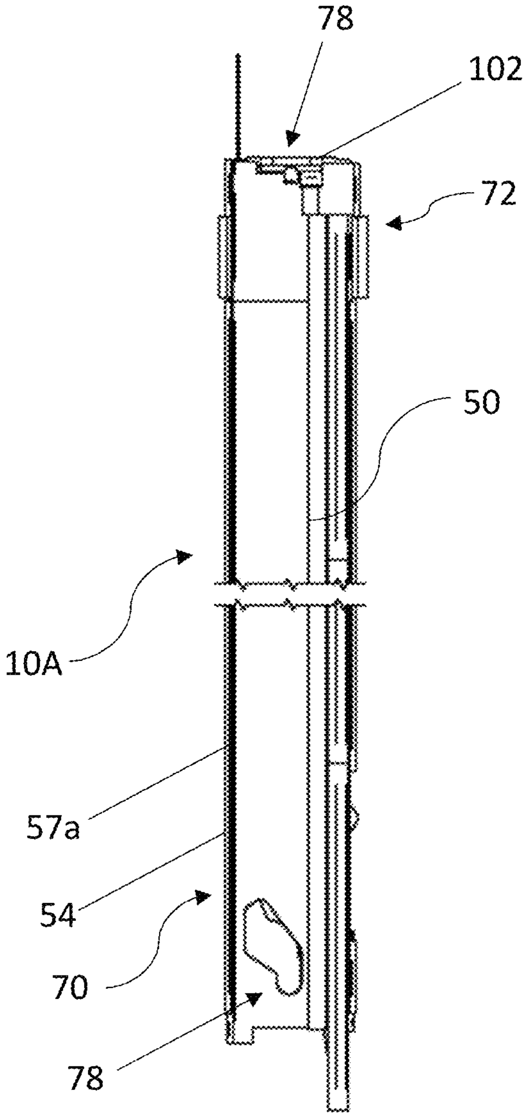
FIG. 4B is an isometric side view of a sash-facing side of the sash carrier, in accordance with embodiments.

FIGS. 4A and 4B are isometric illustrations of the sash carrier 10A in accordance with embodiments. FIG. 4A shows a first or jamb-facing side of the sash carrier 10A, and FIG. 4B shows a second or sash-facing side of the sash carrier. The sash carrier 10A is an assembly including a generally elongate body 50 having a first end portion 70 and an opposite second end portion 72, a spring mechanism 74, a brake mechanism 76, and a window (or other panel) mount structure 78. As noted above, sash carrier 10A is representative of the other sash carriers such as 10B of the window 8. In embodiments, the sash carrier 10A has a length generally equal to the height dimension of the sash 14A to which it is mounted, to provide a weather-resistant (e.g., water-blocking seal between the bottom member 34, top member 36 and side member 38 of the sash and the first jamb 20 of the window frame 12. In the illustrated embodiments, the sash carrier 10A and sash 14A are configured to be mounted to one another with the first end portion 70 of the sash carrier located adjacent to the bottom of the sash (e.g., by the bottom member 34 of the sash frame 30) and the second end portion 72 of the sash carrier located adjacent to the top of the sash (e.g., by the top member 36 of the sash frame).

Figure 5A:
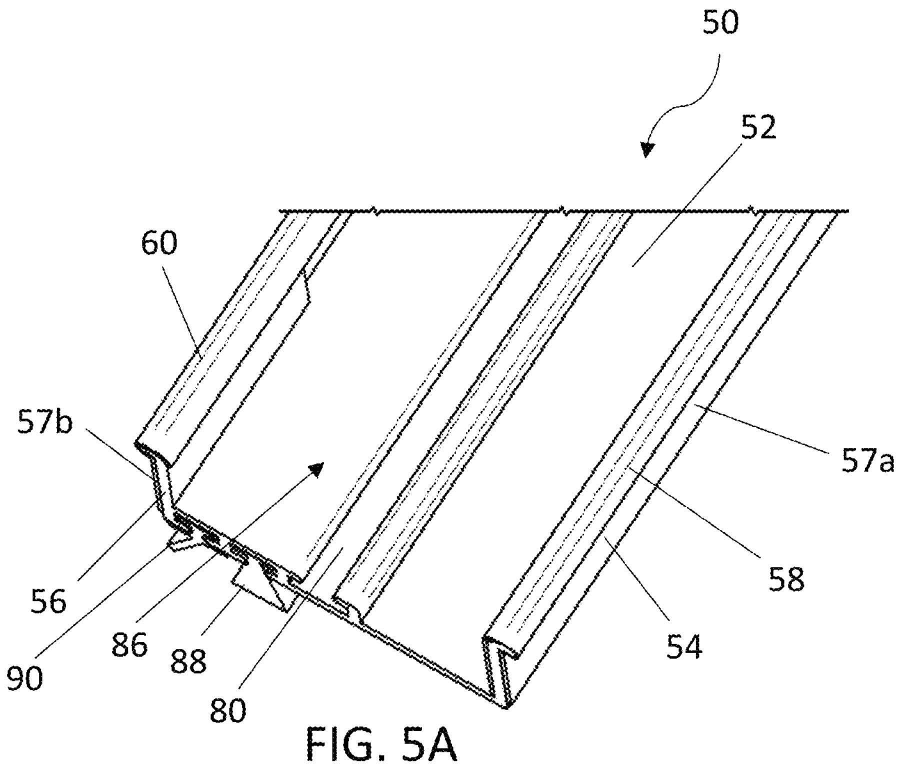
FIG. 5A is a detailed isometric view of the sash-facing side of a portion of a body of the sash carrier, in accordance with embodiments.
Figure 5B:
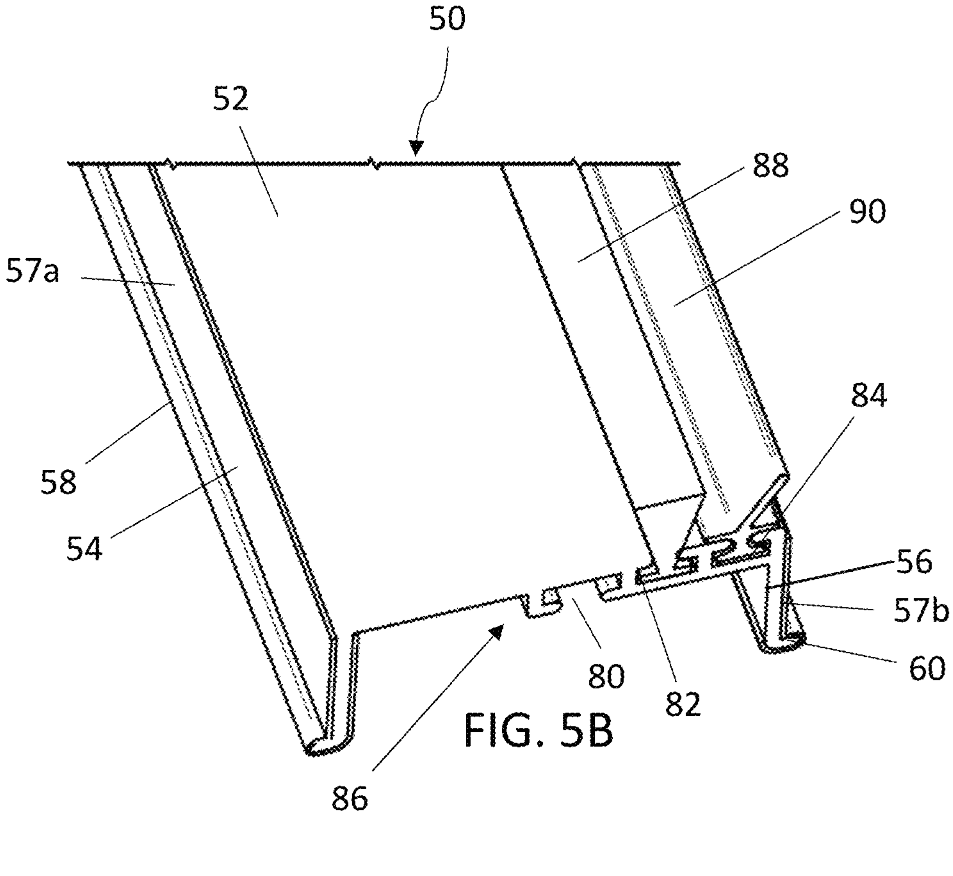
FIG. 5B is a detailed isometric view of the frame-facing side of a portion of the body of the sash carrier, in accordance with embodiments.

FIGS. 5A and 5B are detailed isometric illustrations of a portion of the sash carrier body 50 in accordance with embodiments. FIG. 5A shows the first or jamb-facing side of the sash carrier 10A, and FIG. 5B shows the second or sash-facing side of the sash carrier. The body 50 is a generally U-shaped member in the illustrated embodiments, and includes the base wall portion 52, first side wall portion 54 and second side wall portion 56. The wall portions 52, 54 and 56 define a channel 86 on the jamb-facing side of the body 50. Lips 58 and 60 extend from the side wall portions 54 and 56, respectively, at locations spaced from the base wall portion 52 in a direction away from the channel 86 for provide, at least in part, the sliding engagement functionality of the sash carrier 10A with respect to the jamb 20.

Seal members 57*a* and 57*b* are located on the outer surfaces of the first and second side wall portions 54 and 56, respectively. The seal members 57*a* and 57*b*, which may, for example, include felt and/or polymer members, may extend all, substantially all or portions of the length of the side wall portions 54 and 56 of the body 50, and function as bearings and provide sliding seals between the side wall portions and the inside walls of the first jamb 20 defining the channel 41 in which the sash carrier 10A is slidably engaged. Seal members 57*a* and 57*b* facilitate smooth, low-friction sliding motion of the sash carrier 10 on the first jamb 20. The exterior seal members 57*b* may provide weather-resistant (e.g., water-blocking) seals and the interior seal members 57*a* may provide resistance to air leaks, with long and narrow leak paths. In the case of the exterior seal member 57*b*, the design ensures that the air pressure on the exterior portion of the seal and the air pressure in the space behind the sash carrier are substantially equalized, thus eliminating the tendency for water to be pushed across that barrier. Water that is stopped at this barrier may drain inconsequentially to the exterior. The interior seal members 57*a* may be pressure energized, facilitating increased loading on the seal interface with increasing exterior pressure, and resisting air ingress behind the seal. The seal members 57*a* and 57*b* may enhance the adaptability of the window 8 to installation variations. The seal surfaces are generally parallel to the wall of the building structure in which the window 8 is installed, so hourglass/reverse hourglass installation (e.g., caused by improper shimming during installation and "bowing" or "reverse bowing" of the window frame) may have no or insubstantial effects on the engagement of the sealing surfaces. In embodiments, for example, the seal members 57*a* and 57*b* may accommodate certain degrees of bowing or deflection of the window frame 12 caused by installation, such as for example 0.020 inches, 0.050 inches, 0.100 inches or 0.150 inches lateral deflection of the jambs 20 or 22, while still providing an effective sliding and weather-resistant seal (e.g., with less than 15%, less than 10%, or less than 5% reduction in the seal capability). Conventional or otherwise known ASTM or other test standards may be used to assess performance parameters of these types.

A first mounting structure, shown for example as a first mount track 80, is located on the jamb-facing side of the base wall portion 52. In the illustrated embodiments the first mount track 80 includes structural members defining a generally T-shaped channel. As described in greater detail below, the mounting structure such as first mount track 80 may be used to mount one or more components, including for example components of one or both of the spring mechanism 74 or the brake mechanism 76, to the body 50. Other embodiments include other structures for mounting components such as the spring mechanism 74 and/or brake mechanism 76 to the body 50.

Second and third mounting structures, shown for example as a second mount track 82 and a third mount track 84, are located on the sash-facing side of the base wall portion 52. In the illustrated embodiments, the second mount track 82 and third mount track 84 include structural members defining generally T-shaped channels. Sealing members, such as for example weather strip members 88 and 90, are mounted to mount tracks 82 and 84, respectively. In the illustrated embodiments, the weather strip members 88 and 90 have mounting bases with shapes complementary to the T-shaped channels of the mount tracks 82 and 84, and may be slid into the mount tracks from one of the ends of the mount tracks. Other embodiments may include alternative or additional structures for mounting components such as weather strip members 88 and 90 to the body 50. In the illustrated embodiments, the weather strip member 88 provides a seal between the base wall portion 52 of the body 50 and the first side member 38 of the frame 30 of sash 14A. Weather strip member 90 provides a sliding seal between the body 50 and the first jamb 20 of the window frame 12. Other embodiments include more or fewer weather strip and/or seal members.

Figure 6A:
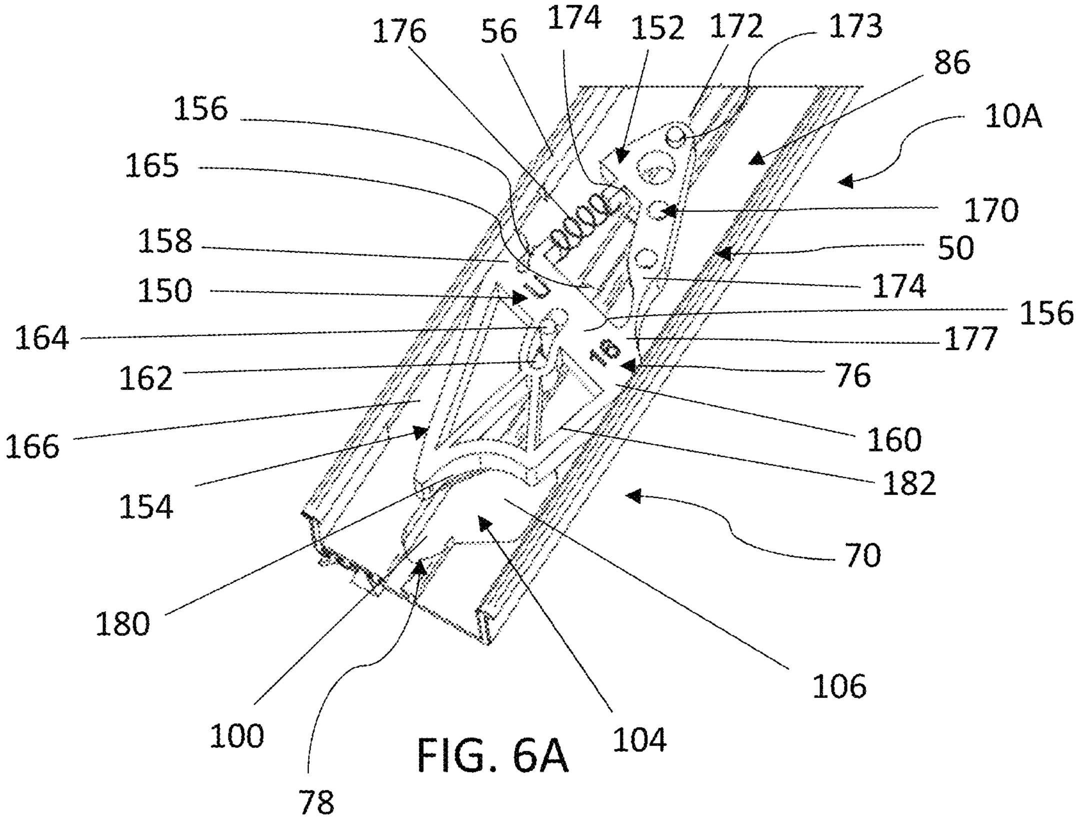
FIG. 6A is a detailed isometric view of the frame-facing side of a portion of the body of the sash carrier showing a brake, in accordance with embodiments.
Figure 6B:
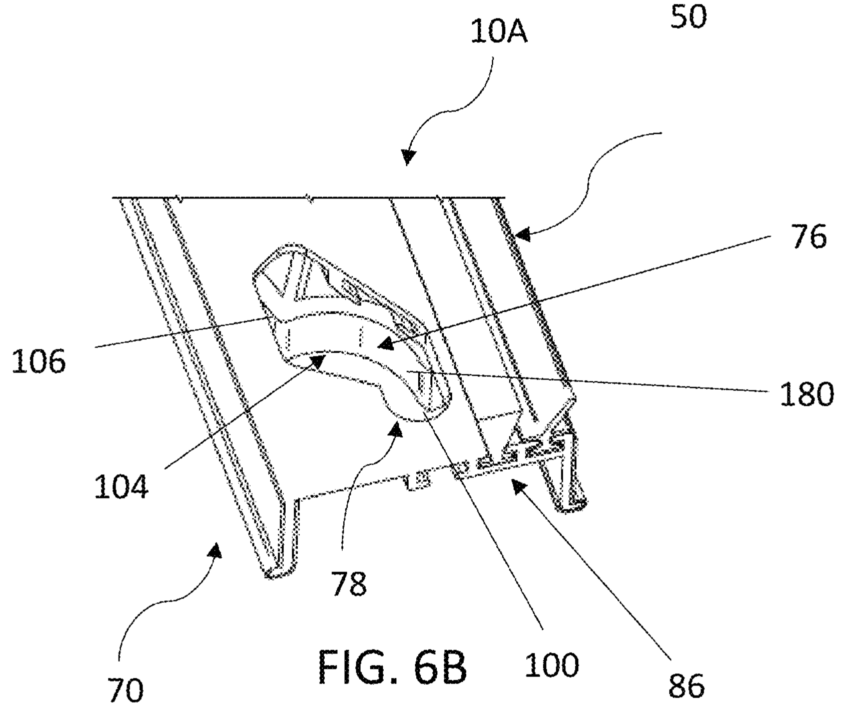
FIG. 6B is a detailed isometric view of the sash-facing side of a portion of the body of the sash carrier showing the brake, in accordance with embodiments.
Figure 7A:
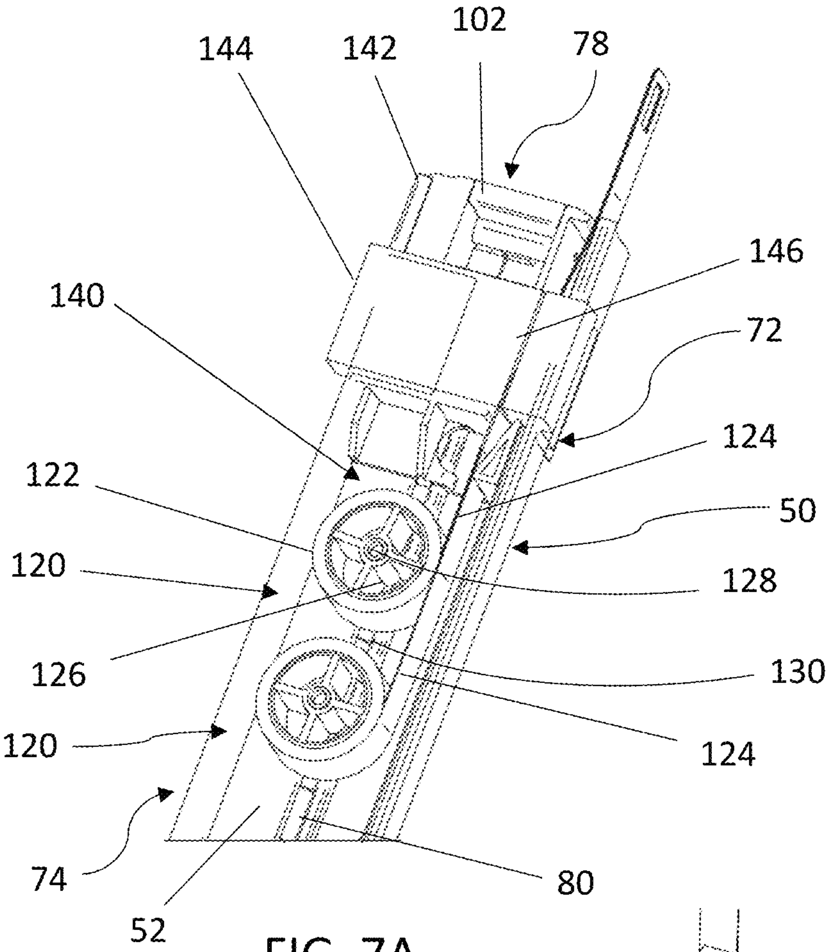
FIG. 7A is a detailed isometric view of the frame-facing side of a portion of the body of the sash carrier showing a balance spring mechanism and a portion of a sash mount mechanism, in accordance with embodiments.
Figure 7B:
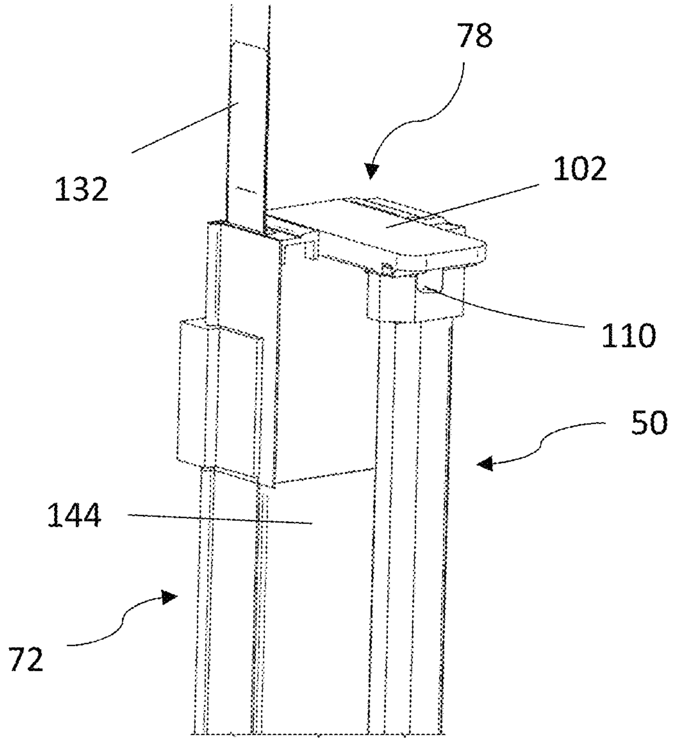
FIG. 7B is a detailed isometric view of the sash-facing side of a portion of the body of the sash carrier showing the balance spring mechanism and a portion of the sash mount mechanism, in accordance with embodiments.

Sash mount structure 78 of the sash carrier 10A may be described with reference to FIGS. 6A, 6B, 7A and 7B. FIGS. 6A and 6B are detailed isometric illustrations of the first end portion 70 of the sash carrier 10A in accordance with embodiments. FIG. 6A shows the first or jamb-facing side of the body 50, and FIG. 6B shows the second or sash-facing side of the body. FIGS. 7A and 7B are detailed isometric illustrations of the second end portion 72 of sash carrier 10A in accordance with embodiments. FIG. 7A shows the first or jamb-facing side of the body 50, and FIG. 7B shows the second or sash-facing side of the body 50. In the illustrated embodiments, the sash mount structure 78 includes a first mount component, shown as a pivot mount or pivot seat 100, and second mount component, shown as a latch 102. The pivot seat 100 may be a recess or opening located on or in the base wall portion 52 of the body 50. In the illustrated embodiments the pivot seat 100 is a semicircular-shaped portion at the bottom of a larger opening 104 in the base wall portion 52 of the body 50. As described in greater detail below, the pivot seat 100 is sized and otherwise configured to receive and seat a bearing pin extending from the sash 14A, and to enable the bearing pin to rotate within the pivot seat. The pivot seat 100 thereby enables the sash 14A to rotate and tilt about a tilt axis between a tilt closed position at which the sash is in planes defined by the sash carriers such as 10A and window frame 12 (e.g., the closed position shown in FIG. 1), and a tilt open position (not shown) at which the sash it tilted out of the planes defined by the sash carriers and the window frame.

The latch 102 is an arm-shaped member having an end portion pivotally mounted to the second end portion 72 of the sash carrier 10A. The latch 102 extends from the body 50 of the sash carrier 10A in the sash-facing direction, and includes a pin 110 extending from its bottom surface in the illustrated embodiments. As described in greater detail below, the latch 102 is pivotally movable and operable between sash engaging and sash release positions. When in the sash 14A is in the tilt closed position and the latch 102 is in the sash engaging position, the latch 102 engages the sash to retain the sash in the tilt closed position. When the latch 102 is in the sash release position, the latch is disengaged from the sash 14A, enabling the sash to be rotated out of the planes defined by the sash carrier 10A and window frame 12 to the tilt open position.

Figure 8:
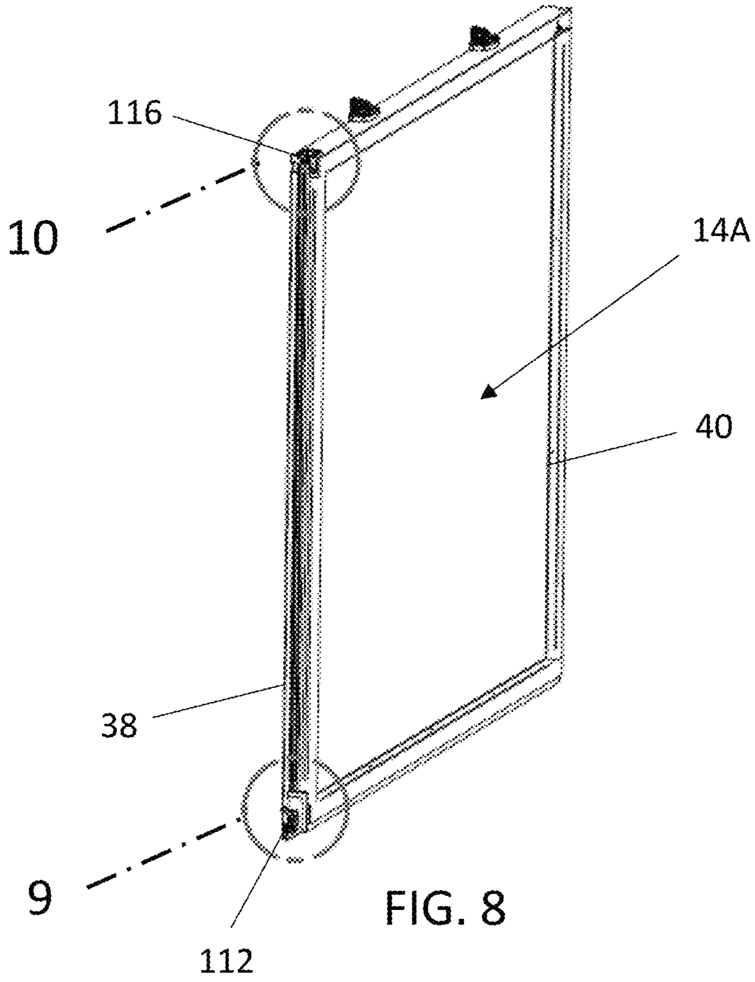
FIG. 8 is an illustration of an exemplary sash in the form of a window panel, in accordance with embodiments.
Figure 9:
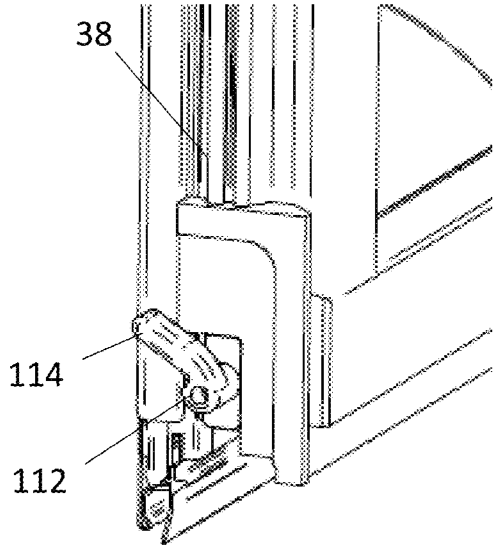
FIG. 9 is a detailed isometric illustration of a portion of a the sash shown in FIG. 8, showing a pivot mount portion of the sash mount, in accordance with embodiments.

FIG. 8 is an isometric illustration of an exemplary sash 14A. A bearing pin 112 extends from the first side member 38 of the sash 14A. Although not visible in FIG. 8, a bearing pin such as 112 also extends from the second side member 40 of the sash 14A. The bearing pins including 112 define the tilt axis on the sash 14A, and are configured to mate with the pivot mounts such as pivot seat 100 on the sash carrier 10A (FIGS. 6A, 6B). FIG. 9 is a detailed illustration of the portion of the sash 14A including the bearing pin 112. The illustrated embodiments include an actuator arm 114 extending from the bearing pin 112. As described in greater detail below, in embodiments including the actuator arm 114, the actuator arm may actuate the brake mechanism 76 when the sash 14A is tilted to its tilt open position (e.g., the brake mechanism is self-energized by the rotating or tilting motion of the sash).

Figure 10:
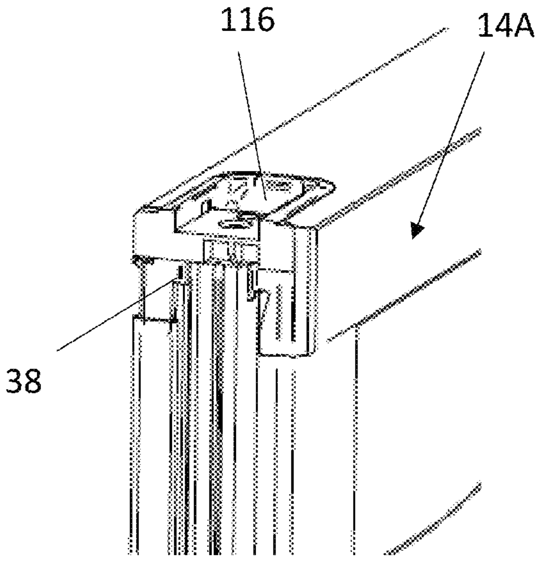
FIG. 10 is a detailed isometric illustration of a portion of a the sash shown in FIG. 8, showing a latch receiving portion of the sash mount, in accordance with embodiment.

The illustrated embodiments sash 14A also include a latch receiver 116 on the sash. The latch receiver 116 is configured to be releasably engaged by the latch 102 on the sash carrier 10A (e.g., as a shown in FIGS. 7A, 7B), and in the illustrated embodiments is located on the upper portion of the sash frame 30, adjacent to the first side member 38. As shown in FIG. 10, in embodiments the latch receiver 116 includes a recess defined by a hardware component mounted to the top edge of the top member 36 of the sash frame 30.

Spring mechanism 74 and other components on the second end portion 72 of the sash carrier 10A may be described with reference to FIGS. 7A and 7B. The illustrated embodiments of the spring mechanism 74 include two coil springs 120, each including a coil 122 of flexible tape 124, mounted to the sash-facing side of the body 50. The coils 122 have hubs 126 that may be mounted to the base wall portion 52 of the body 50, for example by pins 128 extending from the base wall portion. In the illustrated embodiments, each pin 128 is part of a mount member also including a base 130, and the pin extends from the base. The base 130 is configured to mate and engage with the first mount track 80. For example, base 130 may be slid into the first mount track 80 from an opening on an end of the body 50, located at a desired position on the body, and secured to be body by an attachment structure and/or process such as heat staking or adhesive. Portions of the tape 124 extend from the coils 122 beyond the end portion 72 of the sash carrier 10A, and are configured to be mounted to the jamb of the window frame 12 (e.g., to the jamb 20 for the sash carrier 10A). FIG. 7B, for example, illustrates a mounting structure 132 on an end of the tape 124 to facilitate mounting the tape to the window frame 12. The spring mechanism 74 functions as a counterbalance to the weight of the sash 14A when the sash is moved between its sliding open and sliding closed positions in the window frame 12. Although two coil springs 120 are shown for purposes of example in the illustrated embodiments, other embodiments may include fewer or more such coil springs. Alternatively or additionally, embodiments of sash carriers such as 10A may include other types of spring mechanisms. Although mounted to the second end portion 72 of the body 50 in the illustrated embodiments, in other embodiments the spring mechanism 74 may be located at other positions on the body, and/or mounted to the body by other approaches.

An end cap 140 on the second end portion 72 of the sash carrier 10A may be described with reference to FIGS. 7A and 7B. As shown, the end cap 140 engages the jamb-facing side of the body 50, and includes a top wall member 142. The latch 102 is mounted to the end cap 140 in the illustrated embodiments, and the top wall member 142 and latch form a cover over the channel 86 of the body 50. In embodiments, the end cap 140 includes structures (e.g., T-shaped members, not shown) configured to mate and engage with the first mount track 80. In embodiments of these types, the end cap 140 may be slid into the first mount track 80 from an opening on the second end portion 72 of the body 50, located at a desired position on the body, and secured to be body by an attachment structure and/or process such as heat staking or adhesive. The end cap 140 functions as a seal to block vertical air flow past the back side of the sash carrier 10A. In other embodiments the end cap 140 may be attached to the body 50 by other structures and methods.

A seal member 144 is mounted to the end cap 140. The seal member 144, which may for example be resilient polymer foam, provides a sliding and weather-resistant seal between the sash carrier 10A and the first jamb 20. As shown, the end cap 140 and seal member 144 include an opening such as slot 146 through which the tape 124 of the spring mechanism 74 extends.

Brake mechanism 76 may be described with reference to FIGS. 6A and 6B. As shown, the brake mechanism 76 includes an engagement portion 150, biasing portion 152 and actuator portion 154. Engagement portion 150 includes an arm 156 having a first end portion 158, a second end portion 160, and a guide slot 162 between the first and second ends. The arm 156 is mounted to the base wall portion 52 of the body 50 by a pin 164 extending through the guide slot 162, and is configured for movement (e.g., rotational movement) between a retracted position and an extended position. When in the retracted position (not shown), the first end portion 158 of the arm 156 is located within the channel 86 of the body 50. When in the extended position shown in FIG. 6A, the first end portion 158 of the arm 156 extends through an opening 166 in the side wall portion 56 of the body 50. As described in greater detail below, when the arm 156 is in the retracted position the brake mechanism 76 is in its release position, and allows the sash carriers such as 10A and the sash 14A mounted thereto to slide between the sliding open and sliding closed positions. When the arm 156 is in the extended position, the brake mechanism 76 is in its brake position, and movement of the sash carriers such as 10A and the sash 14A mounted thereto is inhibited.

Biasing portion 152 biases the engagement portion 150 to its retracted position. In the illustrated embodiments the biasing portion 152 includes an arm 170 having a first end portion 172 and a second end portion 174, and a biasing member such as spring 176. The first end portion 172 of the arm 170 is mounted to the base wall portion 52 of the body 50 for movement (e.g., rotational movement), for example by a pin 173. The second end portion 174 of the arm 170 is coupled to the second end portion 160 of the arm 156 of the engagement portion 150 by a hinge 177. Spring 176 is mounted to and extends between the first end portion 172 of the arm 170 and the first end portion 158 of the arm 156.

Actuator portion 154 includes a trigger 180 coupled to the arm 156 of the engagement portion 150 by lever 182. The trigger 180 is configured to be engaged by the actuator arm 114 extending from the bearing pin 112 on the sash 14A (FIG. 9) when the sash is mounted to the sash carrier 10A (e.g., when the bearing pin is seated in the pivot seat 100). The opening 104 in the base wall portion 52 of the body 50 is configured to allow the actuator arm 114 to move through the base wall portion to its operative position as the sash 14A is being mounted to the sash carrier 10A.

In the illustrated embodiments, the engagement portion 150, biasing portion 152 and actuator portion 154 of the brake mechanism 76, including hinge 177, are elements of a one-piece polymer member. Pins 164 and 173 extend from and are parts of mount members also including a bases 165 and 174 in the illustrated embodiments, and the pins extend from the bases. The bases 165 and 174 may be configured to mate and engage with the first mount track 80. For example, bases 165 and 174 may be slid into the first mount track 80 from an opening on an end of the body 50, located at desired positions on the body, and secured to be body by an attachment structure and/or process such as heat staking or adhesive.

When the sash 14A is in its tilt closed position, the actuator arm 114 on the bearing pin 112 is located at a position that enables the biasing portion 152 to bias the engagement portion 150 to the retracted position, enabling the sash carrier 10A and the sash 14A to slide between the sliding open and sliding closed positions. When the latch 102 is moved to its release position and the sash 14A is tilted to its tilt open position, the actuator arm 114 on the bearing pin 112 rotates as the sash tilts, engages the trigger 180, and causes the actuator portion 154 to drive the engagement portion 150 to its extended position against the bias force provided by the biasing portion 152. The first end portion 158 of the arm 156 extends beyond the wall portion 56 of the body 50 to engage a portion of the first jamb 20 of the window frame 12 when the engagement portion 150 is in this extended position. The brake mechanism 76 is thereby actuated to the brake position, and the sash carrier 10A and sash 14A mounted thereto are inhibited from movement when the sash is in its tilt open position.

Various modifications and additions can be made to the exemplary embodiments described herein without departing from the spirit and scope of this disclosure. For example, while the embodiments described above refer to particular features, the scope of this disclosure also includes embodiments having different combinations of features and embodiments that do not include all of the described features. Accordingly, the scope of this disclosure is intended to embrace all such alternatives, modifications, and variations as fall within the scope of the claims, together with all equivalents thereof.

What is claimed is:

1. A fenestration unit, comprising:
a frame including a first jamb and a second jamb;
a sash including a first side and second side; and
first and second sash carriers, each coupling one of the first side or the second side of the sash to one of the first jamb or the second jamb of the frame, each of the first and second sash carriers including:
a body, comprising:
a first side coupled for sliding movement on one of the first jamb or the second jamb, wherein the sash carrier facilitates the sliding movement of the sash between a sliding closed position and a sliding open position on the frame;
a second side opposite the first side;
a sash mount coupling one of the first side or the second side of the sash to the second side of the body, wherein the sash mount facilitates rotating movement of the sash between a tilt closed position and a tilt open position with respect to the body;
a latch member coupled to the body at a spaced-apart location with respect to the sash mount, wherein the latch member is configured to be coupled to the sash and to prevent rotation of the sash with respect to the body when the sash is in the tilt closed position, and to be released from the sash to permit the rotating movement of the sash;
one or more balance springs coupled to the body; and
a brake coupled to the body and operable by the sash between a release position facilitating the sliding movement when the sash is in the tilt closed position and a brake position inhibiting the sliding movement when the sash is in the tilt open position;
wherein each sash mount includes a pivot mount extending through the respective body to facilitate rotation of the sash between the tilt closed position and the tilt open position;
wherein each brake includes:
an engagement portion movable between a retracted position within a perimeter of the body when the brake is in the release position and an extended position through an opening in the body and beyond a perimeter of the body when the brake is in the brake position;
a biasing portion to bias the engagement portion to the retracted position when the sash is in the tilt closed position; and
an actuator portion configured to be actuated by the sash and to move the engagement portion to the extended position when sash is in the tilt open position; and
wherein the sash includes an actuator arm to actuate the actuator portion of each brake, and wherein the actuator arm is coupled to the sash by a pin extending through the respective pivot mount.

2. The fenestration unit of claim 1, wherein each sash carrier includes one or more seal members on the body to provide a weather-resistant seal between the body and the one of the first jamb or the second jamb.

3. The fenestration unit of claim 2 wherein the one or more seal members comprise air permeable and water-resistant members.

4. The fenestration unit of claim 3 wherein the one or more seal members comprise felt.

5. The fenestration unit of claim 1, wherein the latch member includes a member that is movable with respect to the sash carrier and the sash.

6. A fenestration unit, comprising:
a frame including a first jamb and a second jamb;
a sash including a first side and second side; and
first and second sash carriers, each coupling one of the first side or the second side of the sash to one of the first jamb or the second jamb of the frame, each of the first and second sash carriers including:
a body, comprising:
a first side coupled for sliding movement on one of the first jamb or the second jamb, wherein the sash carrier facilitates the sliding movement of the sash between a sliding closed position and a sliding open position on the frame;
a second side opposite the first side;
a sash mount coupling one of the first side or the second side of the sash to the second side of the body, wherein the sash mount facilitates rotating movement of the sash between a tilt closed position and a tilt open position with respect to the body;
a latch member coupled to the body at a spaced-apart location with respect to the sash mount, wherein the latch member is configured to be coupled to the sash and to prevent rotation of the sash with respect to the body when the sash is in the tilt closed position, and to be released from the sash to permit the rotating movement of the sash;
one or more balance springs coupled to the body; and
a brake coupled to the body and operable by the sash between a release position facilitating the sliding movement when the sash is in the tilt closed position and a brake position inhibiting the sliding movement when the sash is in the tilt open position;
wherein each brake includes:
an engagement portion movable between a retracted position within a perimeter of the body when the brake is in the release position and an extended position through an opening in the body and beyond a perimeter of the body when the brake is in the brake position;
a biasing portion to bias the engagement portion to the retracted position when the sash is in the tilt closed position; and
an actuator portion configured to be actuated by the sash and to move the engagement portion to the extended position when sash is in the tilt open position; and
wherein each body comprises an elongated extrusion including an elongated component mounting slot extending along a length of the body on the first side;
wherein each sash carrier includes one or more brake mounting members mounted to the component mounting slot;
wherein each brake is mounted to the body by the one or more brake mounting members;
wherein the component mounting slot includes a T-shaped opening; and
wherein the one or more brake mounting members include:
a base received in the T-shaped opening; and
a pin extending from the base.

7. The fenestration unit of claim 6, wherein the one or more balance springs include coil springs.

8. The fenestration unit of claim 6, wherein:

each sash carrier includes one or more spring mounting members mounted to the component mounting slot, and the one or more balance springs are mounted to the body by the one or more spring mounting members.

9. A fenestration unit, comprising:

a frame including a first jamb and a second jamb;

a sash including a first side and second side; and first and second sash carriers, each coupling one of the first side or the second side of the sash to one of the first jamb or the second jamb of the frame, each of the first and second sash carriers including:

a body, comprising:

a first side coupled for sliding movement on one of the first jamb or the second jamb, wherein the sash carrier facilitates the sliding movement of the sash between a sliding closed position and a sliding open position on the frame;

a second side opposite the first side;

a sash mount coupling one of the first side or the second side of the sash to the second side of the body, wherein the sash mount facilitates rotating movement of the sash between a tilt closed position and a tilt open position with respect to the body;

a latch member coupled to the body at a spaced-apart location with respect to the sash mount, wherein the latch member is configured to be coupled to the sash and to prevent rotation of the sash with respect to the body when the sash is in the tilt closed position, and to be released from the sash to permit the rotating movement of the sash;

one or more balance springs coupled to the body; and a brake coupled to the body and operable by the sash between a release position facilitating the sliding movement when the sash is in the tilt closed position and a brake position inhibiting the sliding movement when the sash is in the tilt open position;

wherein each body comprises an elongated extrusion including an elongated component mounting slot extending along a length of the body on the first side;

wherein each sash carrier includes one or more spring mounting members mounted to the component mounting slot; and wherein the one or more balance springs are mounted to the body by the one or more spring mounting members;

wherein the component mounting slot includes a T-shaped opening; and wherein the one or more spring mounting members include:

a base received in the T-shaped opening; and a pin extending from the base.

10. The fenestration unit of claim 9, wherein each elongated extrusion includes:

a base wall defining the first and second sides of the body;

a first side wall extending from the base wall toward the first side; and a second side wall extending from the base wall toward the first side.

11. The fenestration unit of claim 10, wherein the extrusion further includes:

a first lip extending from the first side wall;

a second lip extending from the second side wall, wherein the first and second side walls and first and second lips engage the one of the first jamb or the second jamb to facilitate the sliding movement.

12. The fenestration unit of claim 11, wherein the extrusion further includes a component mounting slot on the first side.

13. The fenestration unit of claim 11, wherein each body further includes seal members of the first side wall and the second side wall of the extrusion, the seal members configured to provide a weather-resistant seal between the body and the one of the first jamb or the second jamb.

14. The fenestration unit of claim 13 wherein the seal members comprise members that provide one or both of air blocking or water blocking.

15. The fenestration unit of claim 14 wherein the seal members comprise felt.

16. A fenestration unit, comprising:

a frame including a first jamb and a second jamb;

a sash including a first side and second side; and first and second sash carriers, each having a length generally equal to a height dimension of the sash and coupling one of the first side or the second side of the sash to one of the first jamb or the second jamb of the frame, each of the first and second sash carriers including:

a body, comprising:

a first side coupled for sliding movement on one of the first jamb or the second jamb, wherein the sash carrier facilitates the sliding movement of the sash between a sliding closed position and a sliding open position on the frame;

a second side opposite the first side;

a sash mount coupling one of the first side or the second side of the sash to the second side of the body, wherein the sash carrier facilitates rotating movement of the sash between a tilt closed position and a tilt open position with respect to the body;

a latch member coupled to the body at a spaced-apart location with respect to the sash mount, wherein the latch member is configured to be coupled to the sash and to prevent rotation of the sash with respect to the body when the sash is in the tilt closed position, and to be released from the sash to permit the rotating movement of the sash;

one or more balance springs coupled to the body; and a brake coupled to the body and operable by the sash between a release position facilitating the sliding movement when the sash is in the tilt closed position and a brake position inhibiting the sliding movement when the sash is in the tilt open position;

wherein each brake includes:

an engagement portion movable between a retracted position within a perimeter of the body when the brake is in the release position and an extended position through an opening in the body and beyond a perimeter of the body when the brake is in the brake position;

a biasing portion to bias the engagement portion to the retracted position when the sash is in the tilt closed position; and an actuator portion configured to be actuated by the sash and to move the engagement portion to the extended position when sash is in the tilt open position; and wherein each body comprises an elongated extrusion including an elongated component mounting slot extending along a length of the body on the first side:

wherein each sash carrier includes one or more brake mounting members mounted to the component mounting slot;

wherein each brake is mounted to the body by the one or more brake mounting members;

wherein the component mounting slot includes a T-shaped opening; and wherein each of the one or more brake mounting members and the spring mounting members includes:

a base received in the T-shaped opening, and a pin extending from the base.

17. A sash carrier for coupling a sash to a frame, comprising:

a body, wherein the body comprises an elongated extrusion including:

a base wall including first and second sides;

a first side wall extending from the base wall toward the first side;

a second side wall extending from the base wall toward the first side; and wherein the first side wall and the second side wall are configured to engage the frame and to facilitate sliding movement of the sash on the frame between a sliding closed position and a sliding open position;

a pivot seat opening through the base wall, the pivot seat opening configured to receive a pin extending from the sash that couples the sash to the second side of the base wall and that facilitates rotating movement of the sash between a tilt closed position and a tilt open position with respect to the sash carrier;

a latch member on the body at a spaced-apart position with respect to the pivot seat opening, wherein the latch member is configured to be coupled to the sash and to prevent rotation of the sash with respect to the body when the sash is in the tilt closed position, and to be released from the sash and to permit the rotating movement of the sash;

one or more balance springs coupled to the first side of the base wall of the body between the first side wall and the second side wall; and a brake coupled to the first side of the base wall of the body between the first side wall and the second side wall, wherein the brake is operable by an actuator arm coupled to the pin for movement between a release position facilitating the sliding movement of the sash carrier when the sash is in the tilt closed position and a brake position inhibiting the sliding movement when the sash in in the tilt open position;

wherein the body includes an opening in one of the first side wall and the second side wall;

wherein the brake includes an engagement portion that moves between a retracted position with respect to the body when the brake is in the release position and an extended position through the opening in the one of the first side wall and the second side wall to engage the frame when the brake is in the brake position;

wherein the body comprises an elongated component mounting slot on the first side; and wherein one or more of the one or more balance springs or the brake include mounting members mounted to the component mounting slot;

wherein the component mounting slot includes a T-shaped opening; and wherein the mounting members include:

a base received in the T-shaped opening; and a pin extending from the base.

18. The sash carrier of claim 17, including seal members, optionally felt, on the first side wall and the second side wall of the body, to provide a low-friction and weather resistant seal between the sash carrier and the frame.

* * * * *